United States Patent
Chevallier et al.

(10) Patent No.: US 11,999,903 B2
(45) Date of Patent: Jun. 4, 2024

(54) FOAMING FORMULATIONS FOR ENHANCED OIL RECOVERY

(71) Applicants: RHODIA OPERATIONS, Aubervilliers (FR); IFP Energies Nouvelles, Rueil-Malmaison (FR)

(72) Inventors: Eloise Chevallier, Bordeaux (FR); Mikel Morvan, Pessac (FR)

(73) Assignees: ENERGY SOLUTIONS (US) LLC, Princeton, NJ (US); IFP Energies Nouvelles, Rueil-Malmaison (FR)

( * ) Notice: Subject to any disclaimer, the term of this patent is extended or adjusted under 35 U.S.C. 154(b) by 49 days.

(21) Appl. No.: 17/620,896

(22) PCT Filed: Jun. 16, 2020

(86) PCT No.: PCT/EP2020/066562
§ 371 (c)(1),
(2) Date: Dec. 20, 2021

(87) PCT Pub. No.: WO2020/254290
PCT Pub. Date: Dec. 24, 2020

(65) Prior Publication Data
US 2022/0356392 A1    Nov. 10, 2022

(30) Foreign Application Priority Data
Jun. 19, 2019 (EP) .................................... 19181088

(51) Int. Cl.
E21B 43/16 (2006.01)
C09K 8/584 (2006.01)
C09K 8/594 (2006.01)

(52) U.S. Cl.
CPC .............. *C09K 8/594* (2013.01); *C09K 8/584* (2013.01); *E21B 43/166* (2013.01)

(58) Field of Classification Search
CPC ........ C09K 8/594; C09K 8/584; E21B 43/166
USPC .................................................... 166/270.2
See application file for complete search history.

(56) References Cited

U.S. PATENT DOCUMENTS

| 4,796,702 | A | * | 1/1989 | Scherubel | ............... | C09K 8/703 |
| | | | | | | 516/14 |
| 6,966,379 | B2 | | 11/2005 | Chatterji et al. | | |
| 8,453,741 | B2 | * | 6/2013 | van Zanten | .............. | C09K 8/28 |
| | | | | | | 166/305.1 |
| 2007/0034378 | A1 | | 2/2007 | Welton et al. | | |
| 2007/0238624 | A1 | * | 10/2007 | Li | ............................ | C09K 8/68 |
| | | | | | | 507/240 |
| 2008/0103069 | A1 | * | 5/2008 | Welton | ..................... | C09K 8/68 |
| | | | | | | 507/261 |
| 2015/0068751 | A1 | * | 3/2015 | Saboowala | ............ | C09K 8/594 |
| | | | | | | 166/305.1 |

FOREIGN PATENT DOCUMENTS

| CA | 2555098 A1 | 2/2007 |
| CN | 105315978 A | 2/2016 |
| CN | 108003849 A | 5/2018 |
| EP | 2343353 A2 | 7/2011 |
| WO | 2008012242 A1 | 1/2008 |

OTHER PUBLICATIONS

International Search Report issued in International Application No. PCT/EP2020/066562, dated Sep. 14, 2020 (3 pages).
Written Opinion of the International Searching Authority issued in International Application No. PCT/EP2020/066562, dated Sep. 14, 2020 (6 pages).
International Preliminary Report on Patentability issued in International Application No. PCT/EP2020/066562, dated Dec. 21, 2021 (8 pages).
Examination Report issued in Canadian Application No. 3,143,590; dated Sep. 21, 2023 (7 pages).

* cited by examiner

*Primary Examiner* — Zakiya W Bates
*Assistant Examiner* — Ashish K Varma
(74) *Attorney, Agent, or Firm* — Osha Bergman Watanabe & Burton LLP

(57) ABSTRACT

The invention relates to a composition which comprises within an aqueous medium: —at least one ethoxylated alkylamine; and—at least one amphoteric or zwitterionic surfactant. The invention further relates to the use of said compositions as foaming compositions, in particular for EOR (enhanced oil recovery).

13 Claims, No Drawings

FOAMING FORMULATIONS FOR ENHANCED OIL RECOVERY

This application is a U.S. national stage entry under 35 U.S.C. § 371 of international Application No. PCT/EP2020/066562 filed Jun. 19, 2020, which claims priority to European Application No. 19181088.6 filed on Jun. 19, 2019, the whole content of these applications being herein incorporated by reference for all purposes.

TECHNICAL FIELD

The present invention relates to the enhanced recovery of crude oil from subterranean formations, in particular carbonate-based subterranean formations, and more particularly to the enhanced oil recovery techniques using foaming compositions.

BACKGROUND

In the extraction of oil from a hydrocarbon reservoir (oil-bearing reservoir such as a rock formation), according to a first step, referred to as "primary recovery," the oil is driven out of a producing well by the overpressure existing naturally within the reservoir. This primary recovery allows access to only a small quantity of the oil contained in the reservoir, typically on the order of 10 to 15% at most.

In order to enable the continuation of the extraction of the oil after this primary recovery, secondary production methods are used, when the pressure of the reservoir becomes insufficient to move the oil that is still in situ. Typically, a fluid is injected (reinjection of the water produced, diluted or undiluted, injection of sea water or river water, or else injection of gas, for example) within the hydrocarbon reservoir, in view of applying within the reservoir an overpressure suitable for driving the oil to the producing well(s). A conventional technique in this context is water injection (also referred to as flooding or "waterflooding") or the injection of gas ("gasflooding"), in which large volumes of water or of gas, respectively, are injected under pressure into the reservoir via injection wells. This injection induces the driving of a portion of the oil encountered by the water or the gas toward one or more producing well(s). However, the aforementioned secondary production methods such as the injection of water or of gas enable one to extract only a relatively small portion of the hydrocarbons in situ (typically on the order of 30%). This partial flushing is due in particular to the trapping of oil by capillary forces, to differences in viscosity and density existing between the injected fluid and the hydrocarbons in situ, as well as to heterogeneities on the microscope scale or macroscopic scale (on the scale of the pores and also on the scale of the reservoir).

In order to try to recover the rest of the oil, which remains in the subterranean formations after the use of the primary and secondary production methods, different techniques have been proposed, referred to as "enhanced oil recovery" techniques (or enhanced (or improved) hydrocarbon recovery EHR), more commonly referred to using the term "EOR" (for the English "Enhanced Oil Recovery").

Among the EOR techniques, some use compositions capable of foam forming. These techniques can use foams that are preformed before their injection into a hydrocarbon reservoir or alternatively foaming compositions capable of forming a foam in situ in the subterranean formation where they are injected, in the presence of a gas (co- or post-injected, or else present in the subterranean formation).

The use of foams or of foaming compositions in EOR is most often intended to maximize the flushing of the subterranean formation, in particular in order to access less accessible zones which would be flushed little or not at all by non-foaming compositions. The use of foams or of foaming compositions is in particular advantageous in the case of naturally fractured reservoirs. These naturally fractured reservoirs differ from the conventional reservoirs, which can have some fractures, by the density and the dimensions of the fractures which form a true network, which induces a particularly complicated oil recovery problem.

Typically, the foaming compositions used in EOR comprise anionic surfactants. Although relatively effective in the general case, these anionic surfactants have limits when used in certain hydrocarbon reservoirs, in particular in carbonate-based formations: in fact, if anionic surfactants are used in carbonate-based formations, they tend to strongly interact with the carbonates and thus tend to be retained within the reservoir.

In general, the use of cationic surfactants in this context does not prove to be an acceptable alternative to the anionic surfactants: certainly, the cationic surfactants have less affinity for the carbonates, but the foams formed from these cationic surfactants generally have very low stability, in particular at high temperature.

DETAILED DESCRIPTION

One aim of the present invention is to provide foaming compositions suitable in particular for EOR operations in carbonate-based hydrocarbon reservoirs (naturally fractured or not) and this in particular at relatively high temperatures, typically between 80 and 120° C.

For this purpose, according to the present invention, foaming compositions of a particular type are proposed, which comprise at least one cationic (more exactly cationizable) surfactant of a specific type, namely of ethoxylated alkylamine type, which is used moreover in combination with at least one amphoteric or zwitterionic surfactant.

More precisely, according to a first aspect, the present invention relates to a composition C, suitable as foaming composition, suitable in particular for EOR, which comprises, within an aqueous medium M:

at least one ethoxylated alkylamine; and
at least one amphoteric or zwitterionic surfactant.

The inventors now have established that, although based on surfactants of cationic type, the particular foaming compositions of the invention surprisingly enable the formation of stable foams, and this also at relatively high temperatures, in particular between 80 and 120° C., and in the presence of hydrocarbons.

In this context, it turns out that the zwitterionic surfactant used according to the present invention induces the same type of advantages as in the case of foams based on anionic surfactants and surfactants such as betaines known from the prior art. According to the invention, a very high foam stability is achieved. This effect is much more unexpected in the case of the compositions of the invention which are based on cationic surfactants of tertiary amine type, which are not recommended as a general rule in combination with amphoteric or zwitterionic surfactants.

The stability of the foam referred to here can in particular be measured by the half-life of the foam formed by expansion of the foam by a gas (typically dinitrogen used as model gas), with or without the presence of hydrocarbons (typically dodecane used as model hydrocarbon), this half-life being higher the more stable the foam is.

This half-life is typically measured by forming the foam in a cylindrical container, wherein the height of the foam formed above the liquid then reaches an initial height h and then allowing the foam to develop, the half-life corresponding to the duration after which the height of the foam above the liquid goes from the value h to half this value, or h/2.

The compositions according to the invention prove to lead to foams which have longer half-lives than the half-lives of foams formed from the same compositions but not comprising the zwitterionic surfactant.

The cationic surfactants used according to the present invention have another advantage, namely that they generally have a relatively high thermal stability, as do numerous amphoteric or zwitterionic surfactants. According to a particularly advantageous embodiment of the invention, in composition C, one uses surfactants which are stable at least up to 80° C., preferably at least up to 100° C., or even at least up to 120° C., and more advantageously at least up to 150° C. (which is the case for most ethoxylated alkylamines and zwitterionic surfactants), which makes it possible to use the composition of the invention at relatively high temperatures (typically between 40 and 140° C., for example, between 80 and 120° C.).

The surfactants used according to the invention are moreover particularly suitable (particularly in terms of solubility) if the composition C comprises salts, which is nearly always the case for compositions used in EOR, wherein the aqueous medium is typically sea water or formation water. The surfactants used according to the invention have the advantage that they can be used in compositions C of high salinity, for example, having a total salt content of more than 50 g/L, for example, of at least 80 g/L of salts, or even at least 100 g/L, wherein this content typically can reach 200 g/L or even 300 g/L.

According to another aspect, the present invention relates to a method for enhanced recovery of the oil of a subterranean formation having the following steps:
- a composition C of the aforementioned type is injected into said subterranean formation, through at least one injection well, said composition being in the presence of a gas ($CO_2$, dinitrogen, water vapor or hydrocarbon gas, for example) within the subterranean formation; then
- through at least one producing well, a fluid carrying the oil coming out of the subterranean formation is recovered.

According to an advantageous embodiment, the method of the invention is used to extract a hydrocarbon from a carbonate-based subterranean formation, in particular a naturally fractured carbonate-based subterranean formation.

In the context of the method of the invention, the combined presence of composition C and of a gas ($CO_2$, dinitrogen, water vapor or hydrocarbon gas, for example) in the subterranean formation, suitable for forming a foam, can be obtained according to the different procedures, including in particular:
- the prior formation of a foam by expansion of composition C by a gas and the injection of this foam within the subterranean formation; or
- the combined injection of composition C, in non-foamed form, and of the gas within the subterranean formation; or
- the injection of composition C within the subterranean formation, followed by the injection of a gas which will then be brought in contact with composition C within the subterranean formation; or
- the injection of composition C within a subterranean formation containing a gas beforehand (for example, present naturally in the formation and/or injected into the formation beforehand).

According to a particular embodiment, the method comprises:
- the combined injection of composition C, in non-foamed form, and of the gas within the subterranean formation; and/or
- the injection of composition C within the subterranean formation, followed by the injection of a gas which will then be brought in contact with composition C within the subterranean formation.

According to another embodiment, suitable in particular for a subterranean formation with a network of dense fractures, the method comprises:
- the formation of a foam beforehand by expansion of composition C by a gas and the injection of this foam within the subterranean formation;
and/or
- the combined injection of composition C, in non-foamed form, and of the gas within the subterranean formation.

Different aspects and possible embodiments of the invention are described in greater detail below.

Ethoxylated Alkylamine

A composition C according to the invention characteristically comprises a surfactant of cationic type, which is an ethoxylated alkylamine. More precisely, it is a cationizable species which is typically used under pH conditions in which the alkylamine is at least partially in protonated form. A composition C according to the invention can be used, for example, at a pH far from the pKa of ethoxylated alkylamine (typically by at least one or even two pH units), for example, between 4 and 7, in particular between 5 and 6.

According to an advantageous embodiment, the ethoxylated alkylamine used according to the invention has formula (I) below (which corresponds to the protonated form of the amine; it is possible alternatively for the amine to be present in non-protonated form):

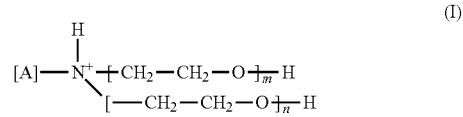

where:
n is a non-zero number, typically greater than or equal to 1, typically between 1 and 12, for example, between 1 and 10;
m is a non-zero number, typically greater than or equal to 1, typically between 1 and 12, for example, between 1 and 10,
the sum n+m preferably remaining below 20, for example, below 10;
[A]- is a group comprising an alkyl group,
this group [A-] preferably being:
an alkyl group R— typically comprising from 8 to 22 carbon atoms, typically between 10 and 18; or
an ethoxylated alkylamine group of formula:

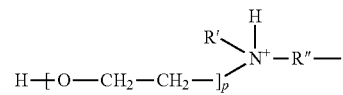

where:
R'— is an alkyl group, typically comprising from 8 to 22 carbon atoms, typically between 10 and 22, in particular between 12 and 18;
—R"— is an alkenyl group, typically a group —$(CH_2)_q$— where q is a whole number between 2 and 5, for example, equal to 3
p is a non-zero number, typically greater than or equal to 1, for example, between 1 and 10 with the sum n+m+p preferably remaining below 20, for example, below 10.

The values of n, m and p given below are in general average values given for a population of molecules of formula (I).

Likewise, typically, in the composition C, mixtures of multiple ethoxylated alkylamines of formula (I) with different alkyl groups R (and if applicable R') are used. In this case, typically, mixtures of compounds of formulas (I) comprising groups R originating from plant oils or specific oil fractions (for example, mixtures of multiple alkyl groups comprising from 12 to 14 carbon atoms, or mixtures of alkyls present in coconut alkyl, so-called "coco alkyls").

Thus, according to a first variant, a composition C according to the invention can comprise, for example, an ethoxylated alkylamine having formula (Ia) below:

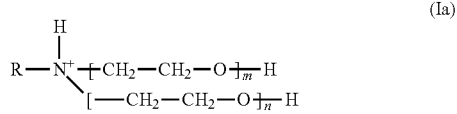

(Ia)

where n, m and R— have the aforementioned meanings.

The ethoxylated alkylamines of formula (Ia) can be, for example, ethoxylated cocoalkylamines.

Advantageously, in the ethoxylated alkylamines of formula (Ia), the sum of n+m is preferably between 2 and 8.

According to a particular embodiment, one can use, for example, in composition C, at least one ethoxylated alkylamine of formula (Ia) where n+m=2

According to another embodiment, one can use, in composition C, at least one ethoxylated alkylamine of formula (Ia) where n+m is strictly greater than 2, in particular where m=3, 4, 5 or 6, for example, where n+m=5. This embodiment is in particular advantageous in terms of solubility of the amine in composition C.

According to another variant, compatible with the preceding variant, a composition C according to the invention can comprise, for example, an ethoxylated alkylamine used at least partially in protonated form, having formula (Ib) below:

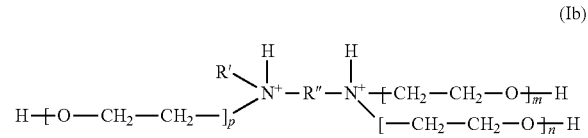

(Ib)

where n, m, p, R'- and —R"— have the aforementioned meanings.

The ethoxylated alkylamines of formula (Ib) can be, for example, ethoxylated cocoalkylamines. Advantageously, in the ethoxylated alkylamines of formula (Ib), the sum of n+m+p is preferably between 3 and 6.

Moreover, in the ethoxylated alkylamines of formula (Ib), group R' typically comprises a number of carbon atoms between 12 and 18, for example, on the order of 16.

As non-limiting examples of ethoxylated alkylamines which can be used in the context of the present invention, one can in particular mention the commercial products FENTACARE® CO2 and FENTACARE® CO5, available from the company Solvay. Other non-limiting examples of ethoxylated alkylamines suitable for carrying out the invention include the product marketed under the name of EthoDuomeen® by AkzoNobel or else FENTACARE® TDO3, of similar structure, available from the company Solvay.

Regardless of the nature of the alkylamines used in composition C, in general, it is preferable for the total concentration of ethoxylated alkylamine to be between 0.05% and 2% by weight, in particular between 0.1% and 1% by weight in composition C (this concentration corresponding to the total sum of the ethoxylated alkylamines present in composition C, with respect to the total weight of composition C).

The Amphoteric or Zwitterionic Surfactant

A composition C according to the invention moreover comprises at least one surfactant of amphoteric or zwitterionic type in a mixture with at least one cationic surfactant of the aforementioned type.

This amphoteric or zwitterionic surfactant can in particular be selected from the alkylamidobetaines, the alkylamidohydroxysultaines, the alkylbetaines, and the alkylhydroxysultaines and the mixtures of these compounds. Preferably, when used in a composition C according to the invention, these surfactants have an alkyl chain advantageously comprising from 8 to 18 carbon atoms. As an example, one can mention, for example, cocoamidohydroxypropyl sultaine.

Other possible compounds are the aminosulfonates of the type of those which are the subject matter of WO 2015/173052. Other usable compounds are the amphoacetates and the amphopropionates. As nonlimiting examples of amphoteric or zwitterionic surfactants which can be used in composition C, one can in particular mention the commercial products Mackam® CBS 50G, LHS-E, LSB 50, Mackam® 35 or Mackam® CB 35, available from the company Solvay.

Regardless of the nature of the amphoteric or zwitterionic surfactants used in composition C, it is generally preferable for the total concentration of amphoteric and zwitterionic surfactants to be between 0.05% and 2% by weight, in particular between 0.1% and 1% by weight in composition C (this concentration corresponding to the total sum of the amphoteric and zwitterionic surfactants present in composition C, with respect to the total weight of composition C).

Moreover, in composition C according to the invention, it is preferable for the ratio by weight of the total weight of the ethoxylated alkylamines with respect to the total weight of the amphoteric and zwitterionic surfactants to be between 10/90 and 90/10, for example, between 20/80 and 80/20, and more preferably between 30/70 and 70/30.

Other Possible Surfactants

According to a first possible embodiment of the invention, composition C can comprise only ethoxylated alkylamines and amphoteric or zwitterionic surfactants as surfactants (binary surfactant system of ethoxylated alkylamine+amphoteric/zwitterionic type).

According to another advantageous embodiment, a composition C according to the invention can comprise, in addition to the aforementioned surfactants, at least one additional anionic surfactant. In this case, the composition generally contains only these three types of surfactants (ternary surfactant system of the ethoxylated alkylamine+ amphoteric/zwitterionic+anionic type)

In all the cases, typically, the total content of surfactants within composition C generally remains between 0.05% and 2% by weight with respect to the total weight of composition C, for example, between 0.1 and 1% by weight with respect to the total weight of the composition.

When composition C comprises anionic surfactants, they can typically be selected from:
- the anionic surfactants of sulfonate type,
  and in particular:
  - the alpha olefin sulfonates, preferably C12 to C20 alpha olefin sulfonates, for example, C14-16 alpha olefin sulfonates
  - the alkyl aryl sulfonates, and in particular the alkyl benzene sulfonates (ABS), where the alkyl group preferably comprises at least 15 carbon atoms, for example, between 15 and 24 carbon atoms, such as, for example, an alkyl aryl sulfonate with a C15-18 alkyl
  - the sulfosuccinates and sulfosuccinates
- the anionic surfactants of sulfate type;
- the mixtures of these anionic surfactants.

If anionic surfactants are used, they are generally a minority within the mixture of the surfactants present in composition C. Thus, the ratio of the total weight of the anionic surfactants with respect to the total weight of surfactants present in composition C typically remains below 50%, or even below 40%, and this ratio is typically between 5 and 35% if anionic surfactants are used.

Other Possible Compounds

A composition C according to the invention can advantageously comprise a certain number of additives in addition to the aforementioned surfactants.

Thus, it is found to be particularly advantageous for the aqueous medium M of a composition C according to the invention to comprise dissolved salts (in this case, the aqueous medium M is typically a brine). More generally, the aqueous medium M preferably has a salinity similar to that of the subterranean formation where composition C is intended to be injected, which tends to improve the efficiency of the recovery of the oil.

Typically, the total salt content in a composition C according to the invention is in the range between 1 and 300 g/L, preferably from 80 to 250 g/L. A composition according to the invention in general comprises multiple types of different salts and the concentration of salts referred to corresponds to the total quantity of all the salts present.

As salts that are advantageously present in the composition of the invention, one can in particular mention in a nonlimiting manner the halides of the alkali and alkaline-earth metals, such as NaCl, KCl, MgCl2, CaCl$_2$) or CaSO$_4$, or the salts of iron such as FeSO$_4$ or FeCl$_2$, or else carbonates or bicarbonates.

Use of the Compositions According to the Invention

The compositions C according to the invention are well suited for forming stable foams, and in particular they were found to be particularly suitable for enhanced oil recovery operations, and this in particular for subterranean formations which are:
- fractured or nonfractured carbonate-based formations; and/or
- reservoirs with problems of gas mobility control including the existence of preferential paths; and/or with a "thief" zone and/or with gravity phenomena ("gravity override" in English); and/or
- with heterogeneity of permeability, these reservoirs preferably not being based on sandstone.

The foaming compositions of the invention are in particular advantageous for forming foams in the supercritical or non-supercritical presence of $CO_2$.

The examples given below illustrate non-limiting embodiments of the invention and some of their advantages.

EXAMPLES

Foams were produced from foaming compositions according to the present invention. The foaming capacities of these compositions and the stability of the foam obtained were evaluated according to the protocol described below:

Each of the foams was formed in an identical 8-mL vial for each test (cylindrical vial with diameter=1 cm), at a temperature of 80° C. and at atmospheric pressure. The formation of the foam was obtained by placing 2 mL of the foaming composition to be tested in the vial with a metal bar (plus optionally 200 microliters of dodecane for the examples in which the formation of foam in the presence of oil is evaluated), leaving the system to reach the temperature of 80° C. for 1 h, then placing the system on a vortex at 80° C. for 15 seconds, which results in a foam forming due to the vibration of the metal bar of the liquid in contact with the air. Then, the vortex was stopped and the foam was allowed to develop.

In each case, the half-life of the foam was measured, which corresponds to the time elapsed between the stopping of the vortex (when the foam reaches its maximum volume in the vial) and the time when the volume of the foam has decreased by half in the vial. In practice, the foam being formed in a cylindrical zone, the height of the foam formed when the vortex is stopped (maximum height) is expected to have decreased by half.

Moreover, the foamability was evaluated, here noted F (for the term "foamability" in English) of the foaming composition used, which corresponds to the ability to create a foam from the composition in question for a given mechanical energy applied to it. This foamability F (foaming ability) was measured in each case (in the presence or absence of oil) with respect to the height of the available air column above the liquid before application of the vortex (maximum height that can be reached by the foam in the vial) with respect to the foam height actually achieved just before the stopping of the vortex.

The foamability F varies from 0 to 1, and a value of F below 0.3 is considered low; an acceptable foaming composition typically should have a foamability F of at least 0.5.

The results obtained are reported in the Table below which indicates the nature and the quantity of the surfactants used (ethoxylated alkylamine and surfactant of amphoteric or zwitterionic type).

The tested compositions comprise these surfactants in a brine comprising, dissolved in water: 79.71 g/L of NaCl; 2.34 g/L of KCl; 4.38 g/L of MgCl2; and 22.53 g/L of CaCl2.

The percentages of the table indicate the content by weight in the composition, with respect to the total weight of the composition. For comparison, tests were carried out on three control compositions containing only ethoxylated alkylamines as surfactants.

| | Without oil | | In the presence of dodecane | |
|---|---|---|---|---|
| Surfactants present in the formulation | F | half-life (min) | F | half-life (min) |
| FENTACARE CO2 0.5% -- CONTROL -- | 1 | 19.3 | 0.34 | 4.5 |
| FENTACARE CO2 0.25% MACKAM LSB50 0.25% | 1 | 53.3 | 0.85 | 20 |
| FENTACARE CO2 0.25% MACKAM LHS-E 0.25% | 1 | 43 | 0.91 | 4.3 |
| FENTACARE CO2 0.25% MACKAM 35 0.25% | 1 | 63.3 | 0.49 | 24 |
| FENTACARE CO2 0.25% MACKAM CB 35 0.15% | 1 | 50.5 | 0.69 | 5.3 |
| FENTACARE CO5 0.5% -- CONTROL -- | 1 | 2 | 0.13 | 2.5 |
| FENTACARE CO5 0.25% MACKAM LSB50 0.25% | 1 | 47.5 | 0.32 | 10 |
| FENTACARE CO5 0.25% MACKAM LHS-E 0.25% | 1 | 23.7 | — | — |
| FENTACARE TD03 0.5% -- CONTROL -- | 1 | 2 | 0.17 | 1 |
| FENTACARE TD03 0.25% MACKAM LSB50 0.25% | 1 | 9.5 | — | — |
| FENTACARE TD03 0.25% MACKAM LHS-E 0.25% | 1 | 6.5 | — | — |

Half-Life (With or Without Oil) and Foamability F of the Tested Compounds

The surfactants used in this example moreover have a good thermal stability. As an illustration, each of these surfactants was subjected to an aging test in the form of a solution at 5 g/L in the aforementioned brine, at 120° C. for 60 days at pH 5. The concentration remains roughly equal to 5 g/L for the entire duration of the test for each of the surfactants tested.

The invention claimed is:

1. A composition C, suitable as foaming composition, which comprises, within an aqueous medium M:
   at least one ethoxylated alkylamine; and
   at least one amphoteric or zwitterionic surfactant
   wherein the ethoxylated alkylamine has formula (I) below:

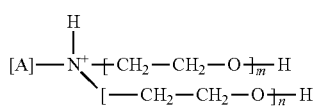
(I)

where:
   n is a non-zero number between 1 and 12;
   m is a non-zero number between 1 and 12, the sum n+m remaining below 20;
   [A-] is a group comprising an alkyl group, selected from:
      an alkyl group R— comprising from 8 to 22 carbon atoms;
      or
      an ethoxylated alkylamine group of formula:

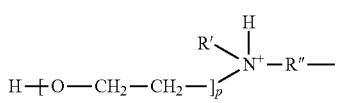

where:
   R'— is an alkyl group, comprising from 8 to 22 carbon atoms;
   —R"— is an alkenyl group, a group —(CH$_2$)$_q$— where q is a whole number between 2 and 5
   p is a non-zero number, between 1 and 10
   with the sum n+m+p remaining below 20.

2. The composition according to claim 1, wherein the surfactants present in the composition C are stable at least up to 80° C.

3. The composition according to claim 1, wherein the ethoxylated alkylamine has formula (Ia) below:

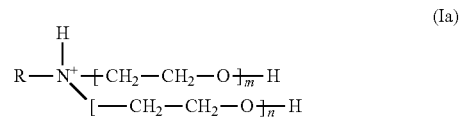
(Ia)

where:
   n is a non-zero number between 1 and 12;
   m is a non-zero number between 1 and 12, the sum of n+m being between 2 and 8;
   [A-] is a group consisting of alkyl group, selected from:
      an alkyl group R— comprising from 8 to 22 carbon atoms;
      or
      an ethoxylated alkylamine group of formula:
   where:
      R'— is an alkyl group, comprising from 8 to 22 carbon atoms;
      —R" is an alkenyl group, a group —(CH$_2$)$_q$—,
      where q is a whole number between 2 and 5, and
      is a non-zero number, between 1 and 10.
   with the sum of n+m+p remaining below 20.

4. The composition according to claim 1, wherein the ethoxylated alkylamine has formula (Ib) below:

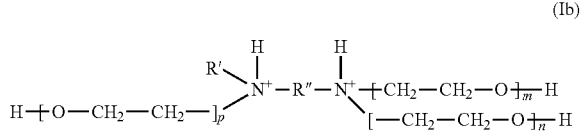
(Ib)

where:
   n is a non-zero number between 1 and 12;
   m is a non-zero number between 1 and 12, the sum of n+m remaining below 20;
   [A-] is a group consisting of alkyl group, selected from:
      an alkyl group R— comprising from 8 to 22 carbon atoms;
      or
      an ethoxylated alkylamine group of formula:
   where:
      R'— is an alkyl group, comprising from 8 to 22 carbon atoms;
      —R"— is an alkenyl group, a group —(CH$_2$)$_q$—,
      where q is a whole number between 2 and 5, and
      p is a non-zero number, between 1 and 10,
      with the sum of n+m+p between 3 and 6.

5. The composition according to claim 1, wherein the total concentration of ethoxylated alkylamine is between 0.05% and 2% by weight in composition C.

6. The composition according to claim 1, wherein the amphoteric or zwitterionic surfactant is selected from alkylamidobetaines, alkylamidohydroxysultaines, alkylbetaines, and alkylhydroxysultaines and mixtures of these compounds.

7. The composition according to claim 1, wherein the total concentration of amphoteric and zwitterionic surfactants is between 0.05 and 2% by weight in composition C.

8. The composition according to claim 1, wherein the ratio by weight of the total weight of the ethoxylated alkylamines with respect to the total weight of the amphoteric and zwitterionic surfactants is between 10/90 and 90/10.

9. The composition according to claim 1, wherein composition C comprises only ethoxylated alkylamines and amphoteric or zwitterionic surfactants as surfactants.

10. The composition according to claim 1, wherein composition C moreover comprises at least one additional anionic surfactant.

11. The composition according to claim 10, wherein the ratio of the total weight of the anionic surfactants with respect to the total weight of surfactants present in composition C remains below 50%.

12. A method for enhanced recovery of the oil of a subterranean formation, comprising the following steps:
  a composition C according to claim 1 is injected into said subterranean formation through at least one injection well, said composition being in the presence of a gas within the subterranean formation;
  then
  through at least one producing well, a fluid carrying the oil coming out of the subterranean formation is recovered.

13. The method according to claim 12, wherein the injecting is into a subterranean carbonate-based subterranean formation.

* * * * *